No. 682,025. Patented Sept. 3, 1901.
C. BRADSHAW & W. S. TOBEY.
COMBINED WEED CUTTER AND CORN CULTIVATOR.
(Application filed May 27, 1901.)
(No Model.)
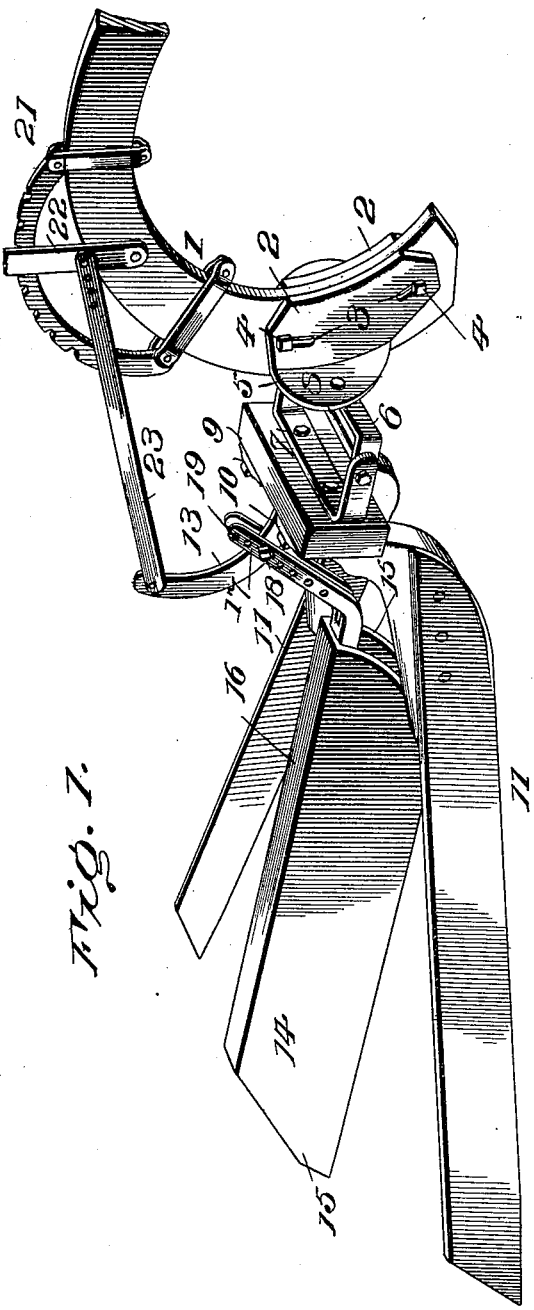
Witnesses
Walter A. Williams
Wm. J. Jacobi
Inventors
C. Bradshaw
W. S. Tobey
By
Jno. Smith, their Attorney

UNITED STATES PATENT OFFICE.

CHARLES BRADSHAW AND WALLACE S. TOBEY, OF HOPE, KANSAS.

COMBINED WEED-CUTTER AND CORN-CULTIVATOR.

SPECIFICATION forming part of Letters Patent No. 682,025, dated September 3, 1901.

Application filed May 27, 1901. Serial No. 62,163. (No model.)

*To all whom it may concern:*

Be it known that we, CHARLES BRADSHAW and WALLACE S. TOBEY, citizens of the United States, residing in Hope, in Dickinson county, State of Kansas, (whose post-office address is Hope, Kansas,) have invented a new and useful Combination Weed-Cutter and Corn-Cultivator, of which the following is a specification.

This invention relates to improvements in combined weed-cutters and corn-cultivators.

The object of the invention is to provide a structure which can be readily applied to a plow or cultivator standard to effectually cut out the weeds and simultaneously cultivate the soil without in anywise destroying the plants.

Many other objects and advantages will become apparent in the description to follow and be particularly pointed out in the claims.

In the drawings, Figure 1 is a perspective view of an improved weed-cutter and corn-cultivator. Fig. 2 is a plan view of the same.

The numeral 1 indicates a plow or cultivator standard. Fastened to each side of the lower end of the standard are plates 2, slotted as at 3, through which pass bolts 4 for securing the attachment in position. The plates 2 have outwardly-extending ears 5, and bolted thereto is a yoke 6, connected to a similar yoke 7 by a cross-pin 8. Yoke 7 is bolted to a head-block 9, to which the knives and shield are directly attached. Castings 10 extend rearwardly outwardly and are slightly inclined from the head-block and have rigidly fixed to their lower ends the knives 11, the latter consisting of flat blades curved at the front ends and sharpened. An arm 13 extends upwardly from the head-block for carrying the shield 14. The shield consists of two sides 15 15 and a top 16. To the latter is fixed a bar 17, turned up and bifurcated at its front end to straddle the arm 13. A bolt 18, passing through any one of a series of holes 19, securely fastens the shield in any predetermined position. Bolted or otherwise secured to the beam of the standard is a segment 21 and coacting therewith is a hand-lever 22, connected to the arm 13 by a link 23.

The parts thus constructed and arranged the operation is substantially as follows: The apparatus is drawn over the ground in such manner that the plants come under the shield and are not destroyed or are they bruised by the soil being thrown up against them by the knives. Lever 22 is operated to throw the knives down into the ground and the shield over the plants, whereupon the knives by reason of their inclination cut down into the earth and under the roots of the weeds, tearing the latter up and throwing them off to the sides. At the same time the knives turn over the soil and effectually cultivate it.

The various mechanical elements being hinged in the manner described permit of the easy raising and lowering of the shield and knives, and at the same time either or both can be adjusted to a nicety. These features are provided without destroying the necessary strength incident to an apparatus of this character, and should any of the parts become broken or worn out others can be quickly and readily substituted.

Having thus fully described our invention, what we claim as new, and desire to secure by Letters Patent, is—

1. An apparatus of the class described, comprising a standard, a yoke adjustably secured to said standard, a head-block, a yoke secured to said head-block, the latter yoke and the yoke secured to the standard being pivotally secured together, knives extending rearwardly and outwardly from the head-block, a shield intermediate the knives, and means for raising and lowering the shield and knives.

2. An apparatus of the class described, comprising a standard, two plates adjustably secured to the standard, a yoke secured to the plates, a head-block, a yoke secured to said head-block, the two yokes being pivoted together, knives extending rearwardly from the head-block, a shield intermediate the knives, means for adjusting the shield independently of the knives, and means for simultaneously raising the knives and shield.

3. An apparatus of the class described comprising a standard, a head-block pivotally connected to the standard, knives extending rearwardly from the head-block, a shield intermediate the knives, means for adjusting the shield up or down independent of the knives, and means for simultaneously lifting and holding the shield and knives in a predetermined position.

4. An apparatus of the class described comprising a standard, two plates having slots, bolts passing through the slots to the standard, a yoke rigidly secured to the two plates, a head-block, a yoke projecting forwardly from the head-block, a pin passing through the two yokes to pivotally secure them together, castings projecting from the head-blocks, knives fixed to said castings, an arm extending upwardly from the head-block, a bar having a series of perforations, a bolt passing through one of said perforations and the arm, and a shield having depending sides fixed to said bar.

CHARLES BRADSHAW.
WALLACE S. TOBEY.

Witnesses:
M. H. MALOTT,
PAUL HURD.